United States Patent [19]

Gagneux et al.

[11] Patent Number: 5,174,678
[45] Date of Patent: Dec. 29, 1992

[54] COUPLING LINK COMPRISING A BALL SOCKET, ESPECIALLY FOR A WINDSHIELD WIPER LINKAGE

[75] Inventors: Georges Gagneux; Jean-Paul Boissac, both of Chatellerault, France

[73] Assignee: Valeo Systemes d'Essuyage, Montigny-le-Bretonneux, France

[21] Appl. No.: 762,384

[22] Filed: Sep. 19, 1991

[30] Foreign Application Priority Data

Sep. 24, 1990 [FR] France .................. 90 11753

[51] Int. Cl.⁵ .............................................. B25G 3/34
[52] U.S. Cl. .................................... 403/269; 403/71; 249/83
[58] Field of Search ............... 403/71, 76, 70, 69, 403/77, 267, 265, 122, 133, 269; 29/898.049, 898.05, 898.048; 249/83, 85

[56] References Cited

U.S. PATENT DOCUMENTS

| | | | |
|---|---|---|---|
| 3,704,903 | 12/1972 | Ito | 403/122 |
| 4,552,480 | 11/1985 | McIntyre | 403/71 X |

FOREIGN PATENT DOCUMENTS

| | | |
|---|---|---|
| 58278 | 8/1982 | European Pat. Off. . |
| 2176294 | 10/1973 | France . |
| 2608233 | 6/1988 | France . |
| 301309 | 11/1954 | Switzerland . |

*Primary Examiner*—Andrew V. Kundrat
*Attorney, Agent, or Firm*—Morgan & Finnegan

[57] ABSTRACT

A motion transmitting coupling link comprises a metal base element having a flattened end portion having a through hole in which a ball socket is anchored. The ball socket is moulded in position and is made of a plastics material.

Radial slits extend outwardly from the edge of the hole, so as to define tongues which are bent out from the plane of the end portion. The invention is especially applicable to use in windshield wiper linkages.

10 Claims, 2 Drawing Sheets

COUPLING LINK COMPRISING A BALL SOCKET, ESPECIALLY FOR A WINDSHIELD WIPER LINKAGE

FIELD OF THE INVENTION

This invention relates to a motion transmitting coupling link of the kind having a ball socket, especially though not exclusively for a windshield wiper linkage.

BACKGROUND OF THE INVENTION

A windshield wiper linkage is used in order to transmit motion from a motor, via an output spindle of a speed reduction unit, to at least one driving spindle of a windshield wiper. Essentially the linkage consists of several coupling links connected to each other. For layout reasons, the reduction gear spindle often has to lie in a plane which is not parallel to the plane passing through the drive axis of the wiper, which is why the various coupling links must be connected through ball and socket type couplings. The latter not only enable one link to rotate with respect to another, but also allow for a certain amount of angular displacement between any two links. These couplings are commonly in the form of a ball carried by one end of one coupling link and articulated in a ball socket which is carried by another end of another link.

As described for example in the specification of U.S. Pat. No. 3.704,903, a hole is provided in one end of the coupling link, the hole being generally perpendicular to the plane of this end portion, and a ball socket is moulded on to the end portion around the hole. For this purpose, partial circumferential grooves are formed concentrically with the orifice, so that during the moulding operation the material in which the ball socket is moulded can be introduced into these grooves. The socket will then be anchored in the end portion of the link and any parasitic circumferential movement of the ball socket will be prevented.

However, the assignee of the present applicant have found that such an arrangement has a major drawback. This is that, during the moulding operation, the amount of moulded plastics material varies from one part to another of the longitudinal plane of the end portion of the link and in its vicinity. The effect of this, during cooling of the material and as a result of the inherent asymmetry of the moulding operation, is that shrinkage of the moulded material leads to irregular variations in thickness of different portions of the ball socket, and this in turn can adversely affect the anchoring of the ball socket on the base member comprising the remainder of the link.

DISCUSSION OF THE INVENTION

An object of the present invention is to overcome the above drawback.

According to the invention, a motion transmitting coupling link, especially for a windshield wiper linkage, having, in at least one end portion defining an end of the link, a hole in which a ball socket is moulded, is characterised in that slits are formed so as to extend form the edge of the hole, whereby to define tongues which are bent out axially.

In this way, not only is the contact surface between the metal and the plastics material increased, which enables the latter to be anchored more firmly, but also the plastics material is injected in identical quantities on either side of the plane of the end portion of the link, so that during cooling, shrinkage takes place symmetrically, and the thickness of the material of the ball socket is thus of constant thickness around the hole in the end portion.

Further features and advantages of the invention will appear more clearly from the description of preferred embodiments of the invention that follows, this description being given by way of non-limiting example only and with reference to the accompanying drawings.

DESCRIPTION OF PREFERRED EMBODIMENTS OF THE INVENTION

Figure 1:
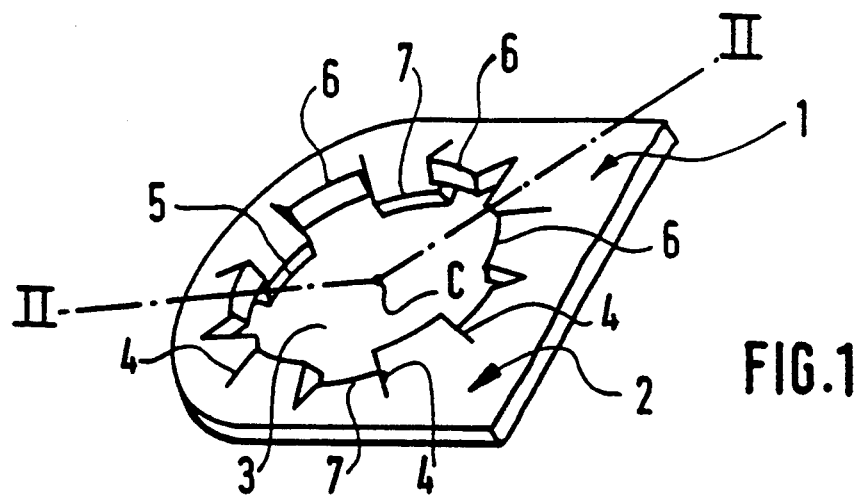
FIG. 1 is a perspective view of one end of a flat, motion transmitting coupling link in accordance with the present invention.
Figure 2:
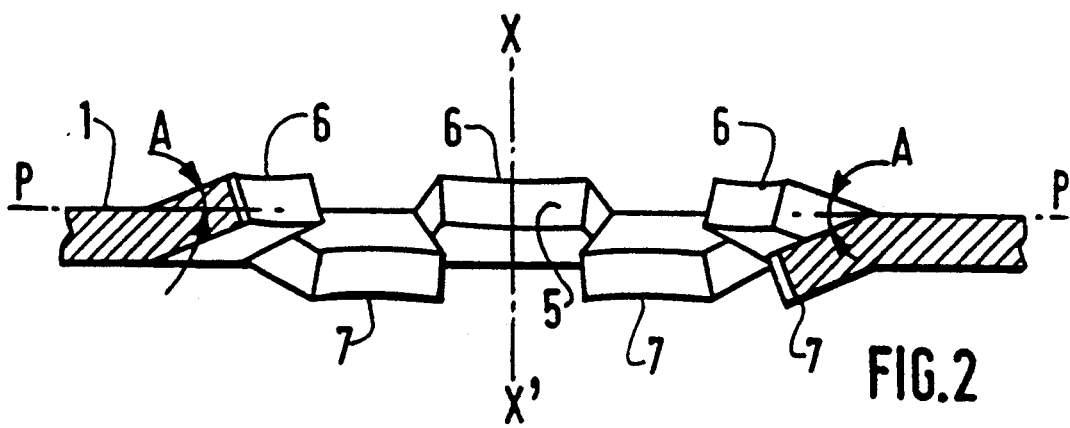
FIG. 2 is a detail view in cross section taken on the line II—II in FIG. 1.

In FIGS. 1 and 2, there can be seen one end portion 1 of a flat coupling link 2 for transmitting motion. The link 1 includes the base member seen in FIG. 1, which is formed from a flat metal blank which has a through hole 3 of generally circular shape, defining an axis XX' which is substantially perpendicular to the longitudinal plane P which passes through one of the outer faces of the end portion 1 of the link 2. This enables the link to be attached to an appropriate component of a motor or actuator (not shown) through a ball socket which will be described below.

At least four slits, and in this example twelve slits, are formed in the material of the end portion 1, around the hole 3. The slits 4, which may for example be formed by a simple slitting operation, are spaced equidistantly form each other in the circumferential direction. In this particular example, the slits 4 extend radially, so as to be aligned with the center C of the hole 3, terminating on the circumferential edge 5 of the latter. In this way the slits 4 define trapezoidal tongues 6 and 7, the shorter base lines of which are coincident with the circumferential edge 5.

As is best seen in FIGS 1 and 2, the tongues 6 are arranged alternately with the tongues 7. These tongues 6 and 7 are bent out axially with respect to the longitudinal plane P, the tongues 6 being bent upwardly and the tongues 7 downwardly. Each tongue 6 is thus arranged between two tongues 7 bent in the opposite axial direction, and vice versa. The angle A through which the tongues 6 and 7 are bent with respect to the plane P is the same for each tongue. In this example, the angle A is of the order of 20 degrees.

Plastics material is then moulded on to the resulting crown of bent tongues, so as to form a ball socket on the flat plate-like element constituting the link 2. This ball socket may be closed at its upper end as indicated at 8 in FIG. 3, or open as at 9 in FIG. 4.

Figure 3:
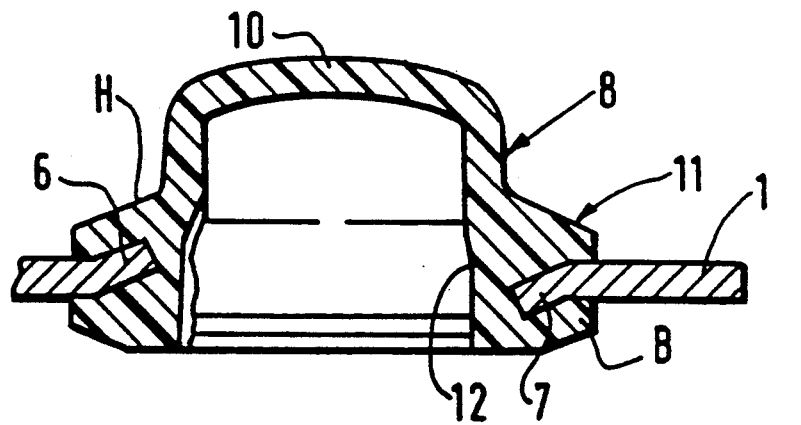
FIG. 3 is a view in cross section of a closed ball socket after being moulded on tot he coupling link.

Referring to FIG. 3, the closed, moulded ball socket 8, closed at its upper part 10, has a peripheral edge portion 11 which entirely covers the tongues 6 and 7 on either side of the outer surfaces of the end 1. The socket 8 has an internal wall portion 12 in the form of part of a sphere, and the ball end (not shown) of a cooperating further link is engaged in the socket 8 so as to engage this wall portion 12.

The distribution and inclination of the tongues 6 and 7 ensure that the final thickness of the socket 8 or 9 shall be regular after shrinkage of the material of the ball socket due to its cooling and solidification. In other words, the circular thickness of the zones H (FIG. 3) and B (FIG. 4) is substantially the same, since in these zones the same quantity of material has been injected, and shrinkage takes place under the same conditions.

Figure 4:
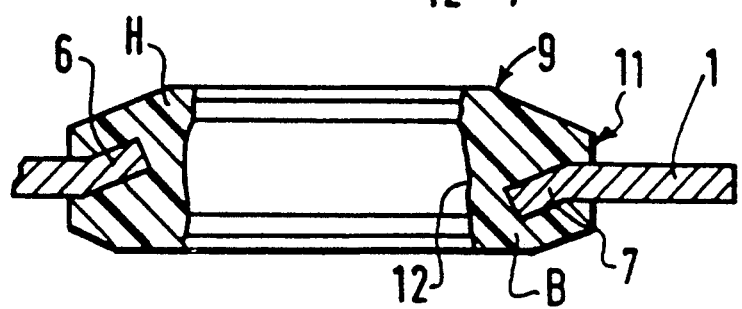
FIG. 4 is a view in cross section, similar to FIG. 3 but showing an open ball socket.

FIG. 4 shows an open ball socket again having a partspherical wall portion 12 and moulded on to the flat link plate 1, and the remarks above especially those relating to the maintenance of regular thickness, apply also in this case.

In the examples shown, there are six tongues 6 and six tongues 7, though there may be any desired number of each.

Figure 5:
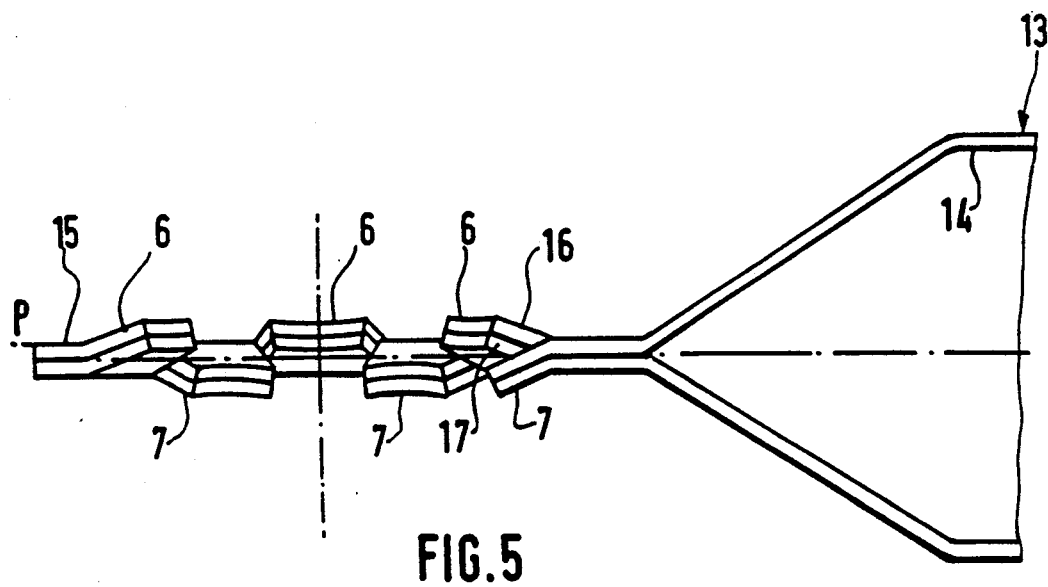
FIG. 5 is a view in cross section showing another embodiment of a motion transmitting coupling link in accordance with the invention, in the form of a tube.

FIG. 5 shows a modification in which the base member of the motion transmitting coupling link 13 comprises a hollow cylindrical tube 14, at least one end of which is so shaped as to produce an end portion 15 having flat surfaces. In order to make the link shown in FIGS. 5 and 6, the end portion of the tube 14, which is initially cylindrical, is flattened so as to produce two flat surfaces 16 and 17 in overlying contact with each other. These surfaces 16 and 17 are joined at their longitudinal ends by a bead or seam 18. Alternatively, the end portion of the tube is expanded from its initial diameter so as to produce a cylindrical end portion of the tube having an increased diameter; this enlarged end portion is subsequently flattened so as to produce the two flat surfaces 16 and 17.

As already described in respect of FIGS. 1 and 2, a hole 3 is simultaneously formed through the surfaces 16 and 17, and tongues 6 and 7 are, again as already described, provided around the hole 3 and are bent out axially in opposite direction as before. Each tongue 6 and 7 thus includes a portion of both flat surfaces 16 and 17.

Figure 6:
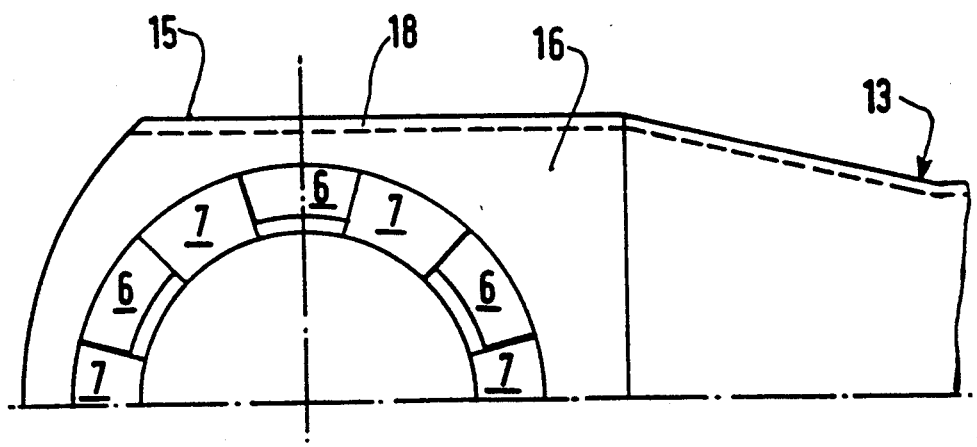
FIG. 6 is an elevation on the component shown in FIG. 5.

By contrast with a coupling link in which the base member is formed from metal plate, the arrangement seen in FIGS. 5 and 6 has the advantage of reducing the transverse width of the base member (i.e. in this case the diameter of the tube) in relation to the size of the ball socket which is to be moulded into the hole and on to the tongues. Moulding of the closed socket 8 or open socket 9 is then carried out in the manner already described.

Numerous other modifications may of course also be introduced, in particular by substitution of means which are technical equivalents, but all within the scope of the present invention. For example, the tongues 6 and 7 need not be in the shape of a trapezium. This would be the case with an arrangement of slots 4 which are not aligned with the centre C of the hole 3.

What is claimed is:

1. A motion transmitting coupling link for a windshield wiper linkage, comprising a base element having a flat end portion with a hole formed through it and a plurality of slits extending outwardly from the edge of the said hole to define a plurality of tongues between them, the tongues being bent out generally axially and the link further comprising a ball socket moulded on to the base member around the hole.

2. A coupling link according to claim 1, wherein the said slits are equally spaced around the said hole.

3. A coupling link according to claim 1, wherein the said hole is circular and each slit extends radially so as to be aligned with the centre of the hole.

4. A coupling link according to claim 1, wherein the said tongues comprise first tongues bent out in one axial direction and second tongues alternating with the first tongues and bent out in the opposite axial direction, with one of the outer faces of the flat end portion defining a plane and each tongue being bent out at the same angle with respect to the said plane.

5. A coupling link according to claim 4, wherein the said angle is of the order of 20 degrees.

6. A coupling link according to claim 1, wherein the said tongues comprise first tongues bent out in one axial direction and second tongues bent out in the opposite axial direction, with each first or second tongue lying between two second tongues or two fist tongues, respectively.

7. A coupling link according to claim 1, wherein the end portion of the link is formed in a metal plate element.

8. A coupling link according to claim 1, wherein the end portion of the link is formed by fully flattening an end portion of a hollow tube.

9. A coupling link according to claim 8, wherein the end portion of the link is formed by first radially expanding, and then full flattening, an end portion of a hollow tube.

10. A coupling link according to claim 8 or claim 9, wherein the said hole, slits and tongues are all formed through the two flat outer surfaces defined on the said end portion of the link.

* * * * *